United States Patent Office 3,347,813
Patented Oct. 17, 1967

3,347,813
DISSOLVING POLYACROLEINS AND AQUEOUS SALT SOLUTIONS THEREOF
Ilse Ursula Nebel, Oberlar, and Gerhard Bier, Troisdorf, Germany, assignors to Dynamit Nobel Aktiengesellschaft, Troisdorf, near Cologne, Germany, a corporation of Germany
No Drawing. Filed July 8, 1965, Ser. No. 470,575
Claims priority, application Germany, Aug. 5, 1964, D 45,115
11 Claims. (Cl. 260—29.6)

Heretofore only a few solvents have been known for macromolecular polyacroleins. Ethylenecarbonate, sulfoxides, and sulfones have been used for the purpose. These, however, have the disadvantage that heating to, for example, 150° C. is necessary, and this may cause discoloration.

It has been found that concentrated solutions of lithium bromide, zinc chloride or calcium thiocyanate can be used for dissolving polyacrolein polymer, including polymers produced by redox-polymerization. Thus, polyacrolein polymer of molecular weight from about 10,000–100,000 or over can be dissolved. Preferably, the dissolving is carried out at room temperature. It can be accelerated by heating. The solution thus produced are in general clear or slightly colored. The polyacrolein polymer can be precipitated from the salt solutions with water or organic solvents which are readily soluble in water, Suitable organic solvents are, for example, acetone, methanol, ethanol, propanol, isopropanol, glycol, glycerin, dioxane, tetrahydrofurane, and the like.

The solutions of the salts can be, and preferably are, saturated or nearly saturated. In general, they should be at least 90% saturated. A saturation solution of zinc chloride at 20° C. is 78.6 wt. percent zinc chloride. A saturated solution of calcium thiocyanate at 20° C. is 59 wt. percent of the salt. A saturated solution of lithium bromide at 23° C. is 62 wt. percent of the salt.

The solutions of the polyacrolein polymer can be used for the production of fibers or films in conventional ways, for example, by providing the solution in the form desired and precipitating or evaporating the solvent. Also, the solutions can be utilized for carrying out reactions involving polyacrolein polymer.

The invention is further described in the following examples.

Example 1

125 mg. polyacrolein with a molecular weight of about 35,000 are dissolved at room temperature in 25 ml. of a 75% aqueous zinc chloride solution (25 wt. percent water; 75 wt. percent zinc chloride) by stirring. A clear solution is obtained.

Example 2

125 mg. polyacrolein with a molecular weight of about 100,000 are dissolved at room temperature in 25 ml. of a saturated aqueous calcium thiocyanate solution by stirring. A slightly colored solution is obtained.

Example 3

60 mg. polyacrolein with a molecular weight of about 35,000 are dissolved at room temperature in 25 ml. of a saturated aqueous lithium bromide solution by stirring. A slightly colored solution is obtained.

Example 4

250 mg. polyacrolein with a molecular weight of about 35,000 are dissolved at room temperature in a saturated aqueous calcium thiocyanate solution by stirring. A slightly colored solution is obtained.

Example 5

750 mg. of a mixed polymerizate of 90% acrolein and 10% vinyl ethyl ether with a molecular weight of about 60,000 are dissolved in 25 ml. of a saturated aqueous zinc chloride solution under shaking at room temperature. A clear colorless solution is obtained. Upon dilution with 500 ml. water the polymer again precipitates unchanged.

Example 6

1,000 mg. of a mixed polymerizate of 90% acrolein and 10% styrene with a molecular weight of about 60,000 and dissolved in 25 ml. of a saturated aqueous calcium rhodanide solution under stirring at room temperature. A clear colorless solution is obtained. Upon dilution with 500 ml. water the polymer again precipitates unchanged.

Example 7

750 mg. of a mixed polymerizate of 90% acrolein and 10% methacrolein with a molecular weight of about 25,000 are dissolved in 25 ml. of a saturated aqueous zinc chloride solution at room temperature under shaking. A clear colorless solution is obtained, from which, upon dilution with 500 ml. water, the polymer may again be precipitated unchanged.

The mention herein of the extent of saturation of the aqueous medium with the salt, such as 50% saturated with the salt, has reference to the salt content of the aqueous medium relative to saturation without the polyacrolein polymer dissolved in the medium.

While the invention has been described in respect to particular embodiment thereof, these embodiments are merely representative of the invention and do not serve to define the limits thereof.

What is claimed is:

1. The method of forming a solution of polyacrolein polymer which comprises dissolving the polymer in an aqueous solution of a compound selected from the group consisting of lithium bromide, zinc chloride and calacium thiocyanate, the solution being at least 90% saturated with said compound.

2. The method of claim 1, wherein said compound is lithium bromide.

3. The method of claim 1, wherein said compound is zinc chloride.

4. The method of claim 1, wherein said compound is calcium thiocyanate.

5. The method of claim 1, wherein said dissolving is at room temperature.

6. An aqueous solution at least 90% saturated with a compound selected from the group consisting of lithium bromide, zinc chloride, and calcium thiocyanate, and having dissolved therein polyacrolein polymer.

7. An aqueous solution according to claim 6, said compound being lithium bromide.

8. An aqueous solution according to claim 6, said compound being zinc chloride.

9. An aqueous solution according to claim 6, said compound being calcium thiocyanate.

10. Method according to claim 1, wherein the solution is saturated with said compound.

11. Aqueous solution according to claim 6, said solution being saturated with said compound.

References Cited

UNITED STATES PATENTS 2,140,921   12/1938   Rein _____ 260—29.6

MURRAY TILLMAN, Primary Examiner.
W. J. BRIGGS, Sr., Assistant Examiner.